United States Patent
Lim et al.

(10) Patent No.: US 9,771,229 B2
(45) Date of Patent: Sep. 26, 2017

(54) MULTIPLE SHEET MEDIA PICK DETECTION

(75) Inventors: Sean Boo Siong Lim, Singapore (SG); Shyh Chije Leong, Singapore (SG); Phey Hong Soh, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 1411 days.

(21) Appl. No.: 12/787,584

(22) Filed: May 26, 2010

(65) Prior Publication Data
US 2011/0292434 A1    Dec. 1, 2011

(51) Int. Cl.
- B65H 7/12 (2006.01)
- H04N 1/00 (2006.01)
- H04N 1/32 (2006.01)

(52) U.S. Cl.
CPC ......... *B65H 7/125* (2013.01); *H04N 1/00702* (2013.01); *H04N 1/00705* (2013.01); *H04N 1/00734* (2013.01); *H04N 1/00737* (2013.01); *H04N 1/00745* (2013.01); *H04N 1/00771* (2013.01); *H04N 1/3263* (2013.01); *H04N 1/32609* (2013.01); *H04N 1/32657* (2013.01); *H04N 1/32667* (2013.01); *B65H 2511/514* (2013.01); *B65H 2511/524* (2013.01); *B65H 2701/1311* (2013.01); *B65H 2701/1313* (2013.01); *B65H 2801/39* (2013.01); *H04N 2201/0098* (2013.01)

(58) Field of Classification Search
None
See application file for complete search history.

(56) References Cited

U.S. PATENT DOCUMENTS

| | | | |
|---|---|---|---|
| 6,761,352 B2 | 7/2004 | Scicluna et al. | |
| 6,768,893 B1* | 7/2004 | Andersen | H04N 1/00 399/367 |
| 7,270,325 B2 | 9/2007 | Sano et al. | |
| 7,303,187 B2* | 12/2007 | Shiho | B65H 3/44 271/9.01 |
| 7,404,559 B2 | 7/2008 | Yoshimura et al. | |
| 7,552,924 B2 | 6/2009 | Sano et al. | |
| 7,654,523 B2 | 2/2010 | Tsukamoto et al. | |
| 7,950,656 B2* | 5/2011 | Adams | B65H 7/125 271/262 |
| 2001/0042956 A1* | 11/2001 | Minoru | B65H 7/125 271/265.04 |
| 2004/0070142 A1* | 4/2004 | Kawasaki | B65H 7/12 271/262 |
| 2005/0012259 A1* | 1/2005 | Sano | B65H 7/125 271/10.01 |

(Continued)

*Primary Examiner* — Hilina K Demeter
(74) *Attorney, Agent, or Firm* — HP Inc. Patent Department

(57) ABSTRACT

Methods and apparatus pertaining to scanning or copying documents are provided. Sheet media are individually transported away from an input location. Optical scanning of the sheet media is initiated in accordance with detecting the passage of leading edges of the sheet media. Electronic signals resulting from the scanning are automatically analyzed to detect trailing edges of overlapping sheet media. A user notification is issued if a multiple sheet pick event is detected. A user can resume scanning or copying of a multiple sheet document at the location where the multiple sheet pick occurred.

16 Claims, 3 Drawing Sheets

(56) References Cited

U.S. PATENT DOCUMENTS

| | | | |
|---|---|---|---|
| 2007/0018376 A1* | 1/2007 | Sano | B65H 7/125 |
| | | | 271/10.01 |
| 2007/0023996 A1* | 2/2007 | Kawasaki | B65H 7/12 |
| | | | 271/262 |
| 2007/0081212 A1* | 4/2007 | Tonami | H04N 1/0035 |
| | | | 359/197.1 |
| 2008/0240743 A1 | 10/2008 | Chen et al. | |
| 2009/0003848 A1 | 1/2009 | Jo et al. | |
| 2010/0066004 A1 | 3/2010 | Shiraishi | |

* cited by examiner

MULTIPLE SHEET MEDIA PICK DETECTION

BACKGROUND

Automatic document feeders (ADF) and other mechanisms are designed to transport sheet media through various media handling machines. Generally, it is desired to transport such media one sheet at a time in a consecutive order until an entire multi-page document has been scanned, copied, etc.

Sometimes, two or more sheets of media are erroneously picked and transported in an overlapping orientation. Incomplete scanning and imaging operations are the results of such an error, requiring a user to reinitiate the task from the beginning.

The present teachings are directed to the foregoing concerns.

BRIEF DESCRIPTION OF THE DRAWINGS

The present embodiments will now be described, by way of example, with reference to the accompanying drawings, in which.

DETAILED DESCRIPTION

Introduction

Methods and apparatus pertaining to scanning, copying and handling sheet media documents are provided. Sheet media are individually transported away from an input location of an all-in-one or other apparatus. Optical scanning of the sheets media is initiated in accordance with detecting the passage of respective leading edges of the media.

Electronic signals corresponding to the scanning are automatically analyzed to detect trailing edges of overlapping sheet media. A user notification is issued if a multiple sheet pick event is detected. A user can resume scanning, copying or other operations on a multiple sheet document at the location where the multiple sheet pick occurred without loss of successfully processed sheets.

In one embodiment, an apparatus includes a controller configured to receive electronic signals corresponding to scanned sheet media. The controller is further configured to detect a multiple sheet media pick by way of the electronic signals. The controller is further configured to provide a warning signal corresponding to the detection.

In another embodiment, a method is performed at least in part by a machine. The method includes determining if plural overlapping sheet media where transported during an optical scanning operation. The method also includes providing an indication to a user of a multiple pick event in accordance with the determination.

First Illustrative Embodiment

Figure 1A:
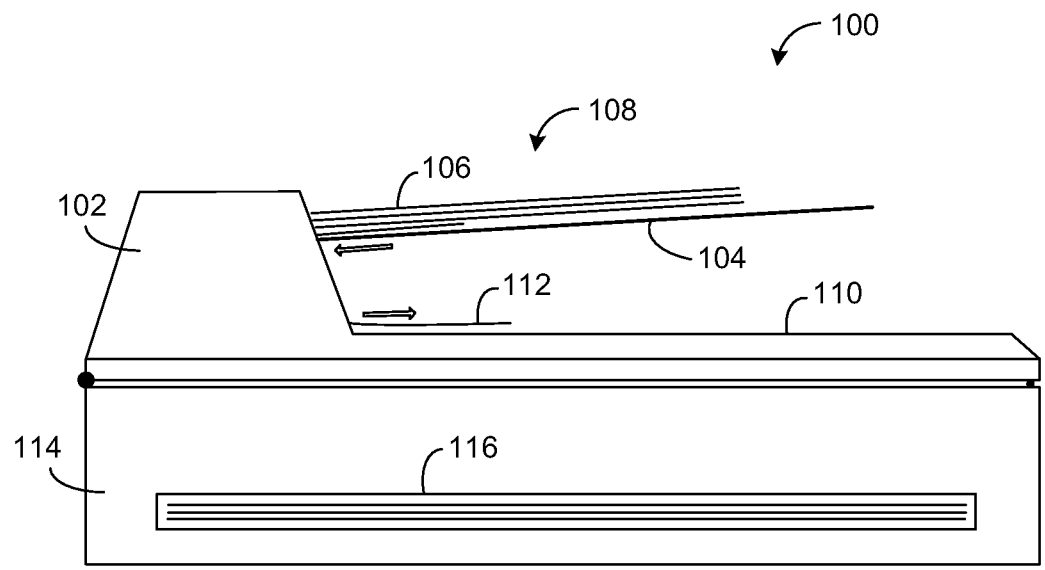
FIG. 1A is an elevation view of an apparatus according to one embodiment.

Reference is now directed to FIG. 1A, which depicts an elevation view of an all-in-one apparatus 100. The apparatus 100 is illustrative and non-limiting with respect to the present teachings. Thus, other devices, apparatus or systems can be configured and/or operated in accordance with the present teachings.

The apparatus 100 includes an automatic document feeder (ADF) 102. The ADF 102 includes an input tray 104. The input tray 104 is configured to support a plurality of sheet media 106 as a stack 108 in receivable orientation with respect to the ADF 102. Individual sheet media 106 can be drawn or "picked" from the stack 108 and transported into the ADF 102 in the direction indicated by the arrow. The ADF 102 is further configured to transport sheet media 106 to an output tray 110. A sheet of media 112 is illustrative of the normal output operations by the ADF 102.

The apparatus 100 also includes a printer 114. The printer 114 is configured to form images on clean or blank sheet media by way of ink deposition, thermal fixing of toner, etc. The printer 114 performs such printing operations in accordance with electronic data signals received from a client computer, a controller, etc. (not shown). The printer 114 can also generate printed copies of documents scanned by the apparatus 100 as described in further detail below. Printed documents or hardcopy are delivered from the printer 114 by way of an output slot 116.

Figure 1B:
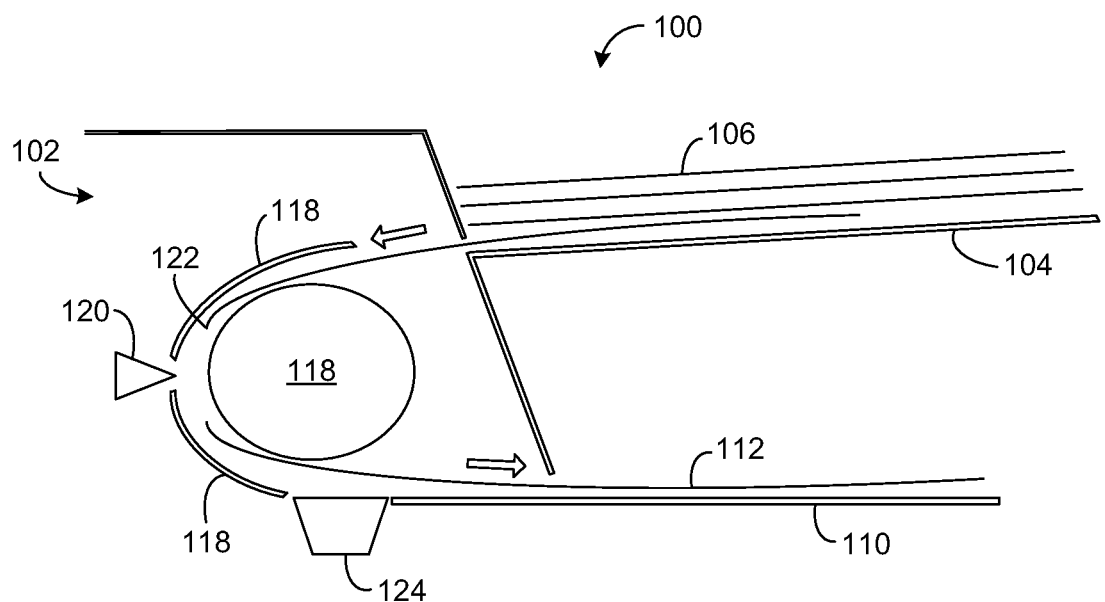
FIG. 1B is an elevation view of selected details of the embodiment of FIG. 1A.

Attention is now directed to FIG. 1B, which is an elevation view of select details of the apparatus 100. The ADF 102 includes a plurality of respectively varying media guide elements 118. The ADF 102 further includes various sheet transport mechanisms that are not shown in the interest of clarity. One having ordinary skill in the printing and related arts can appreciate that various ADFs can be defined and operated, and that further elaboration is not needed for an understanding of the present teachings.

The apparatus 100 also includes an edge detector 120. The edge detector 120 is configured to detect a leading edge 122 of a passing sheet of media 106 and to provide a corresponding electronic signal. Thus, the edge detector 120 is configured to detecting sheet media being transported there past. The apparatus 100 also includes an optical scanner 124. The scanner 124 is configured to optically scan image content borne by sheet media 106 and to provide electronic signals corresponding thereto.

It is noted that the apparatus 100 can be defined by a multi-function or all-in-one device configured to perform a range of normal sheet media handling operations. Such operations include, but are not limited to, scanning a document and providing a corresponding data file, copying documents by way of cooperative operation of the scanner 124 and the printer 114, etc. Other normal operations can also be performed.

It is noted that the edge detector 120 is located apart from the optical scanner 124, and that both are generally within the ADF 102 of the apparatus 100. As such, a sheet media 106 is moved into detectable proximity with the edge detector 120 and then transported a known distance farther before entering scannable proximity with the optical scanner 124. Respective electronic signals or data from the edge detector 120 and the optical scanner 124 are typically provided to a controller of the apparatus 100. Such a controller is described in further detail below.

Second Illustrative Embodiment

Figure 2:
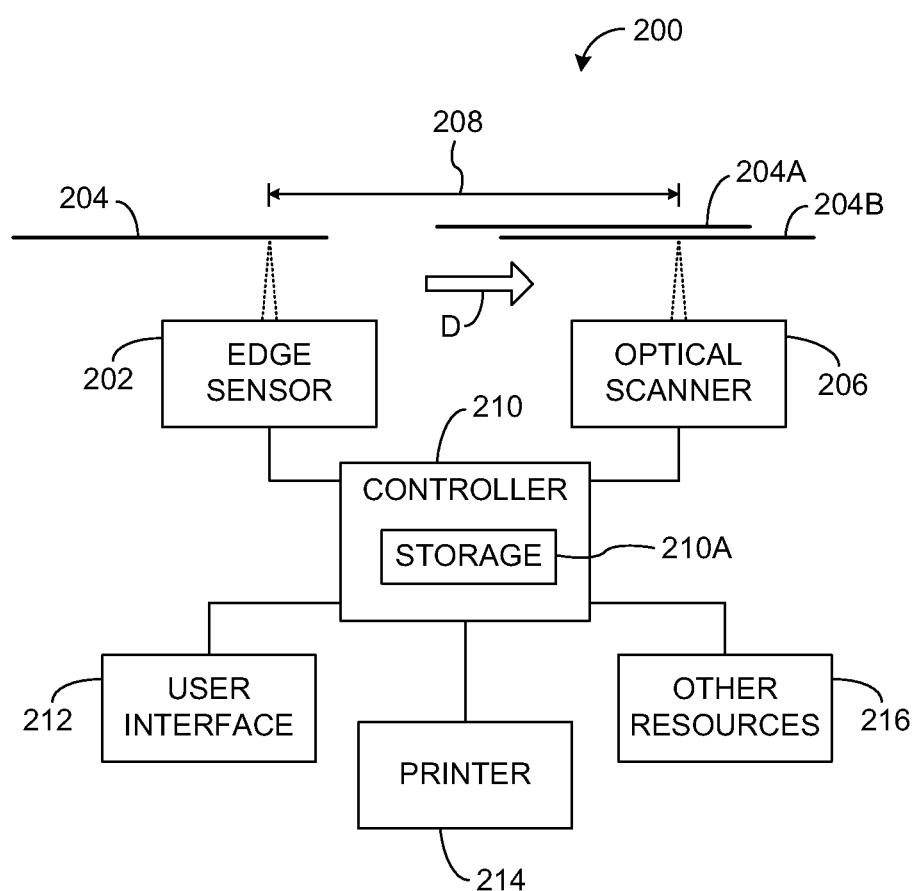
FIG. 2 is a block diagram of an all-in-one apparatus according to one embodiment.

Attention is now turned to FIG. 2, which depicts a block diagram of an apparatus 200. The apparatus 200 can be defined by a multi-function or "all-in-one" media handling device according to the present teachings. The apparatus 200 is illustrative and non-limiting. Thus, other apparatus, devices and systems can also be defined and configured in accordance with the present teachings.

The apparatus 200 includes an edge sensor 202. The edge sensor 202 is configured to detect passing sheet media 204 and to provide a corresponding electronic signal. In particular, the edge sensor (or detector) 202 is configured to detect a leading edge of a sheet media 204 moving in the direction "D" and to provide a signal in response. The edge sensor 202 can operate by way of reflected light rays, obscured light rays, electromagnetic signal deviation, oscillator frequency shift, etc. Other detections schemes can also be used.

The apparatus 200 also includes an optical scanner or scanner 206. The scanner 206 is configured to scan image content borne by passing sheet media 204 and to provide electronic signals or digital data corresponding there to. The scanner 206 can include any respective resources as desired or required, including—but not limited to—a light source, a light sensitive array (e.g., CCD, etc.), one or more lenses, etc. Other resources can also be used. One having ordinary skill in the scanning and related arts can appreciate that various optical scanning means and methods can be employed, and further elaboration is not required for purposes herein.

It is noted that the edge sensor 202 and the scanner 206 are separated by an offset distance 208. As such, a sheet of media 204 is transported along direction "D" into detectable proximity with the edge sensor 202 and then moved an additional distance 208 before entering scanning proximity of the scanner 206. Thus, scanning operations of the scanner 206 can be coordinated or initiated according to the edge detections signals provided by the edge sensor 202.

The apparatus 200 also includes a controller 210. The controller 210 can be defined by or inclusive of any desired resources. Non-limiting examples of such resources include one or more processors or microcontrollers, digital circuitry, analog circuitry, hybrid circuitry, a state machine, one or more application-specific integrated circuits (ASICs), etc. In one embodiment, the controller 210 includes a microcontroller configured to operate in accordance with a computer-readable program code. The controller 210 further includes computer-accessible data storage 210A. The storage 210A can be defined by or include non-volatile memory, random-access memory, magnetic or optical storage, etc.

The controller 210 is coupled in signal communication with the edge sensor 202 and the scanner 206. The controller 210 is configured to receive media detection or edge detection signals from the edge sensor 202 and to coordinate corresponding operations of the scanner 206. The controller 210 is also configured to receive signals or data from the scanner 206 corresponding to image content of passing sheet media 204.

The apparatus 200 also includes a user interface 212. The user interface 212 is coupled in signal communication with the controller 210 and is configured to provide indications to and receive input from a user. The user interface 212 can include an electronic display, touch-sensitive input elements, electrical button switches, indicating lights, etc. Other resources can also be used.

The apparatus 200 also includes a printer 214. The printer 214 is configured to form images on sheet media (e.g., paper, etc.) in accordance with electronic signals or data provided by the controller 210. Such signals or data can correspond to image content of sheet media 204 scanned by the scanner 206. Thus, coordinated operation of the scanner 206 and the printer 214 can be performed to copy an original document onto other media (not shown). Such operations are performed under control influence of the controller 210.

The apparatus 200 further includes other resources 216. Non-limiting examples of such other resources can include an automatic document feeder, a power supply, network communication circuitry, wireless communication circuitry, ink or toner supplies, additional computer-accessible storage media, etc. Other resources can also be used. One having ordinary skill in the media handling arts can appreciate that an apparatus or all-in-one can be defined, configured and operated having various resources. An exhaustive recitation of such resources is not required for purposes of understanding the present teachings.

Normal, non-limiting operations of the apparatus 200 can proceed generally as follows: Sheet media 204 are transported into detectable proximity with the edge sensor 202 and then into scannable proximity with the scanner 206. The controller 210 receives signals from the scanner 206 and records corresponding data within storage media 210A, provides corresponding signals to the printer 214, etc. In this way, electronic files of image content on the sheet media 204 can be derived and recorded, copies can be printed on other media, etc.

During normal operations, two or more sheet media are sometimes inadvertently picked and transported in an overlapping or partially overlapping orientation. Sheet media 204A and 204B are illustrative of such an unintentional occurrence, referred to herein as a "multiple sheet media pick", "multiple pick" or "multi-pick" event. As a result, at least some of the image content borne by sheet media 204A is obscured and cannot be properly scanned by the scanner 206.

The controller 210 is configured to analyze the electronic signals or data provided by the scanner 206 and detect the presence of overlapping sheet media (e.g., 204A and 204B). Specifically, the controller 210 is configured to detect multiple or plural trailing edges of the sheet media (e.g., 204A and 204B) where only one trailing edge is expected. This detection can be performed or verified because of the leading edge detection signals provided by the edge sensor 202.

In response to a multi-pick detection, the controller 210 issues a warning or indication by way of the user interface 212. An alerted user can reinitiate the scanning or copying process at the point where the multiple pick error occurred. The controller 210 is further configured to assist the user by providing a page number or other indication as to the location of the error within a multiple page document. Additionally, the controller 210 is configured to retain any successfully scanned data or printed copy portion of the document, adding subsequently scanned information or copied sheets thereto.

First Illustrative Method

Figure 3:
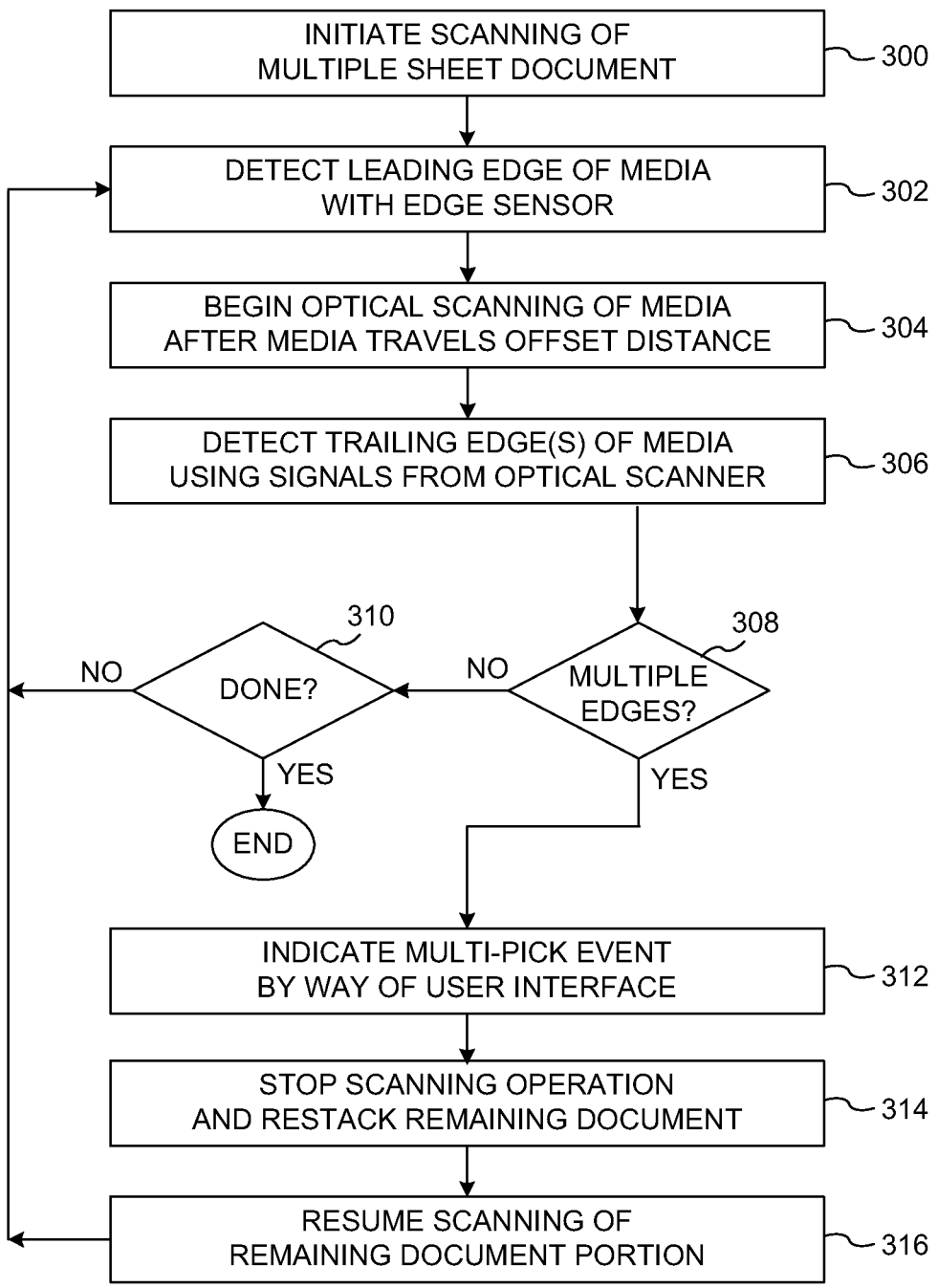
FIG. 3 is a flow diagram depicting a method according to another embodiment.

Attention is directed to FIG. 3, which depicts a flow diagram of a method according to one embodiment of the present teachings. The method of FIG. 3 includes particular operations and order of execution. However, other methods including other operations, omitting one or more of the depicted operations, and/or proceeding in other orders of execution can also be used according to the present teachings. Thus, the method of FIG. 3 is illustrative and non-limiting in nature. Reference is also made to FIG. 2 in the interest of understanding the method of FIG. 3.

At 300, scanning of a multiple sheet document is initiated. For purposes of a present example, it is assumed that a user wishes to scan a document consisting of nine, single-sided sheets. This document is provided at an input location of the all-in-one apparatus 200. In turn, a user provides an input selection by way of the user interface 212 indicating that a scanning job is to begin.

At 302, a leading edge of sheet of media is detected by way of an edge sensor. For purposes of the present example, it is assumed that a first sheet of media 204 is drawn from the input and transported toward the edge sensor 202. The edge sensor detects the leading edge of the media 204 and provides a corresponding signal to the controller 210.

At 304, optical scanning of the sheet media begins after the sheet is transported an offset distance. For purposes of the present example, the controller 210 causes the scanner 206 to begin operations, providing electronic signals or data corresponding to image content on the sheet media 204. Such operations are initiated after the leading edge of sheet media 204 is transported past the edge sensor 202 by the offset distance 208.

At 306, a trailing edge or edges of media are detected using signals from the optical scanner. For purposes of the present example, the controller 210 analyzes signal or data content from the scanner 206 to determines if one or more trailing edges of passing sheet media are detected. It is noted that only a single trailing edge is anticipated for each sheet of media being scanned. It is further noted that the electronic signals or data can be optionally buffered (stored) by the controller 210 prior to analysis.

At 308, a determination is made as to whether multiple trailing edges have been detected. If the controller 210 detects a plurality of trailing edges, indicative of a multiple pick error, the method proceeds to 312 below. If only a single trailing edge is detected, indicative of normal operations, the method proceeds to 310 below.

At 310, a determination is made as to whether the present job is done. If the controller 210 determines that the present job is done, the method is complete for one operational instance and the method ends. If the controller 210 determines that additional scanning, printing, etc., need to be performed, then the method proceeds back to 302 above. For purposes of the present example, eight more sheets of media remain to be scanned and the method proceeds back to 302. The method thus proceeds with the picking, detection and scanning of sheet two of the document, then sheet three, and so on.

At 312, a multi-pick event is indicated to a user by way of the user interface. For purposes of the present example, it is assumed that the controller 210 detected two trailing edges at step 308 above. An example multiple pick error is illustrated by sheets 204A and 204B. As a result, the user is notified of the event by way of the user interface 212. This indication includes a page number, indicating that the error occurred at the end of scanning sheet one of the document.

At 314, the present scanning operation is stopped and the user restacks the remainder of the document. For purposes of the present example, the user reestablishes an orderly stack of sheets two through nine of the document. It is noted that sheet one was successfully scanned just prior to the multi-pick error detection. Thus, data corresponding to sheet one of the document is retained in storage 210A of the controller 210. The restacked remainder portion of the document (sheets two through nine) is placed at an input of the apparatus 200.

At 316, scanning of the remaining portion of the document is resumed. For purposes of the present example, the user provides an input by way of the user interface 212 indicating that the present scanning job can resume. The controller 210 is configured to add additional image data to that already stored in storage 210A. As such, the process returns to 302 above. The remaining sheets of the document are scanned, in consecutive order, until a single data file representing the entire document is stored in storage 210A. This data file can then be printed to hardcopy, communicated to a user by way of network or wireless means, copied to removable storage media, etc.

In general, and without limitation, the present teachings contemplate a number of various methods and apparatus for scanning, copying and printing multi-page documents. A controller is used to analyze signals or data originating at an optical scanner to determine if multiple trailing edges of sheet media are detected. Such a detection corresponds to an accidental multiple pick event by an automatic document feeder or other sheet transportation mechanism.

If multiple trailing edges are detected, a warning signal is provided to a user and the present media handling task is at least temporarily suspended. A page number or other indication is optionally provided to a user indicating a location of the multiple-pick error within a multi-page document. The user is given the option to reorient the remaining portion of the document, including any obscured sheets involved in the multi-pick.

The scanning or copying task is then resumed, without loss of a successfully handled portion or portions of the document. User time and material resources are thus conserved by way of the present teachings. The suspend-and-resume methodologies of the present teachings can be performed more than once with respect to a particular document, thus resulting in reduced user frustration and material waste over known techniques.

In general, the foregoing description is intended to be illustrative and not restrictive. Many embodiments and applications other than the examples provided would be apparent to those of ordinary skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
an edge detector configured to provide an electronic signal in response to detecting a leading edge of a sheet media;
an optical scanner to provide electronic signals corresponding to image content borne by the sheet media, the edge detector being located before the optical scanner along a sheet media transport direction; and
a controller configured to receive the electronic signals from the edge detector and the optical scanner, the controller further configured to detect a multiple sheet media pick by way of detecting plural trailing edges of at least partially overlapping sheet media using the electronic signals from the optical scanner, the controller further configured to provide a warning signal corresponding to the detection.

2. The apparatus according to claim 1 further comprising a user interface configured to provide a multiple pick indication to a user in response to the warning signal.

3. The apparatus according to claim 1, the controller further configured to provide a signal indicating a location within a document corresponding to the multiple sheet media pick.

4. The apparatus according to claim 1 further defined as an all-in-one device including the controller, the edge detector and the optical scanner.

5. The apparatus according to claim 4 further comprising an automatic document feeder configured to pick sheet media from an input and to transport the sheet media relative to the optical scanner and the edge detector.

6. The apparatus according to claim 5, the automatic document feeder further configured to pick sheet media from an input stack of plural sheets of media.

7. A method performed at least in part by a machine, comprising:
    determining if plural overlapping sheet media were transported during an optical scanning operation, the determination made using electronic signals corresponding to image content borne by the sheet media; and
    providing an indication to a user of a multiple pick event in accordance with the determination.

8. The method according to claim 7, the providing the indication to a user performed in response to detecting plural trailing edges of the overlapping sheet media by way of the optical scanning.

9. The method according to claim 7 further comprising:
    detecting a leading edge of a passing sheet media; and
    initiating the optical scanning operation in accordance with the detecting.

10. The method according to claim 7 further comprising picking sheet media from a source and transporting the sheet media relative to an optical scanner using an automatic document feeder.

11. The method according to claim 7, the indication to a user including a location within a document where the multiple pick event occurred.

12. The method according to claim 11, further comprising resuming an at least partially completed document scanning operation after the providing the indication to a user.

13. A multiple sheet media pick detector comprising:
    an edge detector to detect a leading edge of a sheet media transported in a transport direction;
    an optical scanner to produce an optical scan of the transported sheet media, the optical scanner located after the edge detector in the transport direction; and
    a controller to detect a plurality of trailing edges of the transported sheet media using the optical scan following detection of the leading edge,
    wherein detection of the plurality of trailing edges represents a multiple sheet media pick detection.

14. The multiple sheet media pick detector of claim 13, wherein the controller is further to initiate production of the optical scan by the optical scanner after the leading edge is detected by the edge detector.

15. The multiple sheet media pick detector of claim 13, wherein the controller is further to provide a warning signal corresponding to the multiple sheet media pick detection.

16. An automatic document feeder comprising:
    an input tray to support a plurality of sheet media as a stack;
    the multiple sheet media pick detector of claim 13; and
    a media guide element to guide the sheet media from the input tray in the transport direction, the sheet media to be guided first past the edge detector and then past the optical scanner by the media guide element.

* * * * *